Jan. 23, 1962 M. E. NORRIS 3,018,420
TIME DELAY CIRCUIT
Filed July 16, 1959
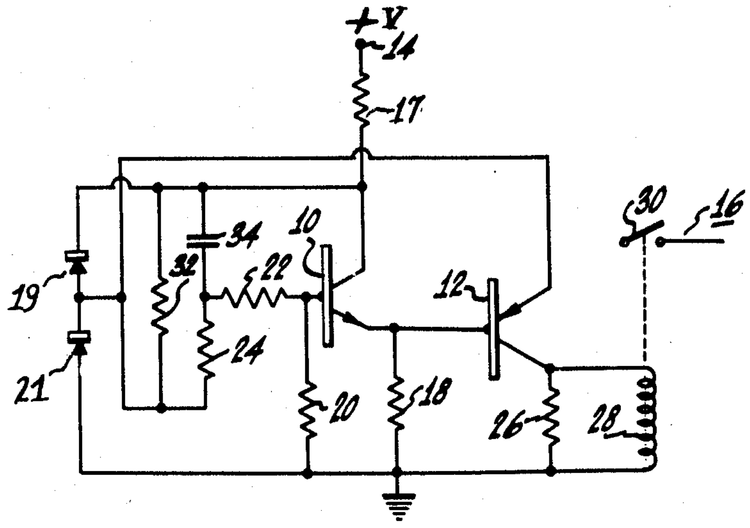
INVENTOR.
MYRON E. NORRIS
BY
Edward M. Farrell
ATTORNEY United States Patent Office 3,018,420
Patented Jan. 23, 1962

3,018,420
TIME DELAY CIRCUIT

Myron E. Norris, Haddonfield, N.J., assignor, by mesne assignments, to American Bosch Arma Corporation, Hempstead, N.Y., a corporation of New York Filed July 16, 1959, Ser. No. 827,645
4 Claims. (Cl. 317—148.5)

This invention relates to time delay relays or voltage level detectors, and more particularly to such circuits which utilize semi-conductor devices as amplifiers.

One of the main disadvantages in using transistors is that they tend to become non-useable when subjected to changes in temperature. In various types of control circuits wherein the operation is dependent to a great extent upon the amplitude of an input signal, it is important that the characteristics of the transistors used be relatively stable with changes in temperature. If the characteristics of the transistors used varies with changes in temperature, the circuit to be controlled may be made operative by input signals below the desired operating point or may require the application of a larger input signal to attain the desired operation. For example, various squelch or relay control circuits may be dependent upon the input signal of a critical value for operation. In such cases, it is important that varying changes in the characteristics of the transistors used do not effect the proper operation of such squelch or relay circuits. It is also sometimes desirable to have such relay circuits operative after a short time delay to assure that signals of short duration, in the nature of noise, do not cause the relay circuit to operate.

It is an object of this invention to provide an improved transistorized control circuit including temperature compensation.

It is a further object of this invention to provide an improved transistorized voltage level detector circuit including temperature compensation to control the operation of a utilization circuit.

It is still a further object of this invention to provide an improved transistorized time delay circuit including temperature compensation.

In accordance with the present invention, a voltage level detector or time delay circuit is associated with a pair of transistors of opposite conductivity types to control the operation of a utilization circuit such as a relay. When the operating voltage or control voltage is first applied, one of the transistors is biased to a conductive state and the second of the transistors is biased to a non-conductive state. The operation of the relay is dependent upon current through the second transistor. A resistive capacitive network is included in the input circuit of the first transistor. Means are provided for applying the control voltage across the resistive capacitive network to switch the operating states of the pair of transistors when the applied voltage exceeds a predetermined level and after a time delay dependent upon the value of the resistive capacitive network.

Other objects and advantages of the present invention will be apparent and suggest themselves to those skilled in the art to which the present invention is related from a reading of the following specification and claims in conjunction with the accompanying drawing, in which the sole figure is a schematic diagram illustrating one form of tthe present invention.

Referring to the drawing, a pair of transistors 10 and 12, each including base, collector and emitter electrodes, are connected to provide temperature compensation. Before the application of a signal to a terminal 14, the circuit shown is inoperative because no operating potential is applied to the transistors 10 and 12. When a positive voltage, which may for example, be a step up control signal transmitted from a ground station to control the operation of a function in an airborne missile, is first applied to the terminal 14, the transistor 10 is biased to a normally conducting state. When the transistor 10 is conducting the voltage from its emitter is applied to the base of the transistor 12 to maintain the transistor 12 non-conducting. A relay 16 has a coil 28 connected in the collector current path of the transistor 12 and is maintained inoperative when the transistor 12 is non-conducting. When the input signal applied to the terminal 14 exceeds a predetermined voltage level, the transistor 10 is switched to a non-conducting state and the transistor 12 is switched to a conducting state thereby causing the relay 16 to become operative.

When a control signal is first applied to the terminal 14 through a resistor 17, operating potentials for the transistors 10 and 12 are developed across a pair of diodes 19 and 21. The diodes 19 and 21 may be of the zener type and are employed as part of a voltage divider and limiter circuit for controlling the amplitude of the voltages applied to the transistors 10 and 12. While they are shown as part of a preferred embodiment of the invention, they are not essential to the operation of the circuit shown, which may involve the use of different elements to achieve the same desired result. The voltage across the diodes 19 and 21 is applied to the collector of the transistor 10. The voltage across the diode 21 is applied to the emitter of the transistor 12.

The emitter of the transistor 10 is directly connected to the base of the transistor 12. A resistor 18 is connected between the emitter of the transistor 10 and ground. A resistor 26 is connected between the collector of the transistor 12 and ground. With no collector current flowing through the coil 28 of the relay 16, the contact 30 of the relay 16 remains normally open.

The various values of the resistors used are chosen to normally bias the transistor 10 beyond cutoff and the transistor 12 conducting.

The transistor 12 is of the PNP type and transistor 10 is of the NPN type. The transistors 10 and 12, being of opposite conductivity types, may be considered as connected in series relationship with the emitter of the transistor 10 being connected to the base of the transistor 12. When a temperature change causes the base emitter junction voltage of the transistor 10 to change, such a change results in the junction voltage of the transistor 12 also changing. Because the transistors 10 and 12 are of opposite conductivity types, the junction voltages developed will be of opposite polarities and therefore cancel each other. Because this is true, the voltage between the base of the transistor 10 and ground across the transistors 10 and 12 will remain relatively unaffected by changes in temperature.

Consider now the operation of the circuit shown when an input signal, which may be a step up voltage is applied to the terminal 14. The voltage across the diode 19 is applied across the resistor 32. The resistor 32 is connected across a resistor capacitive network. A capacitor 34 forms the capacitive portion of this network with the various resistors 20, 22, 24, and 32 forming the resistor portion of this circuit.

When the signal is first applied to the terminal 14, the capacitor 34 starts to charge and the transistor 10 is conducting. The voltage at the base of the transistor 10 is reduced toward ground as the capacitor 34 charges. When the voltage across the resistor 24 drops below a predetermined level, the transistor 10 becomes cut off. At this point, the voltage from the emitter of the transistor 10 applied to the base of the transistor 12 no longer holds the transistor 12 cut off and the transistor 12 becomes conductive. Operation of the relay 16 and closing of the contact 30 thereby results.

If the voltage applied to the terminal 14 doesn't reach a predetermined amplitude, the transistor 12 will remain non-conductive and the relay 16 will not operate. Thus the circuit shown may be considered as a voltage level detector circuit.

When it is desired to operate the relay 16 at some predetermined time interval, the resistors capacitive network may be considered as a part of a time delay network. The values of the capacitor 34 and the various resistors 20, 22, and 24 may be chosen to attain the time interval delay desired.

Thus it is seen that the present invention has provided a relatively simple transistorized voltage level detector circuit in which a time delay for relay operation may be incorporated. The use of a pair of transistors of opposite conductivity types connected in the manner shown provides a relatively simple manner for compensating for changes in the temperature characteristics of the transistors employed.

What is claimed is:

1. A voltage level detector circuit comprising a pair of transistors of the opposite conductivity types, each said transistor including a base, an emitter and a collector electrode, means for connecting the emitter of one of said transistors to the base of said other transistor to compensate for differences in base-to-emitter junction potentials resulting from temperature changes, means for biasing one of said transistors to a normally conducting state and said other transistor to a normally non-conducting state, a time delay circuit including a resistive-capacitive network in the input circuit of said normally conducting transistor, and means for applying a control voltage across said resistive capacitive network to switch the operating states of said transistors after a time delay when said voltage exceeds a predetermined level.

2. A voltage level detector circuit as set forth in claim 1 wherein said control voltage also supplies the operating potentials for said pair of transistors.

3. A voltage level detector circuit comprising a pair of semi-conductor devices, said pair including a first semi-conductor device of the NPN type having an input circuit and a second semi-conductor of the PNP type having an output circuit, each said semi-conductor including a base, an emitter and a collector electrode, means for connecting the emitter of said first semi-conductor device to the base of said second semi-conductor device to compensate for differences in base-to-emitter junction potentials resulting from temperature changes, means for biasing said first semi-conductor device to a normally conducting state and said second semi-conductor device to a normally non-conducting state, a resistive capacitive network connected in the input circuit of said first semi-conductor device, and means for applying a voltage across said resistive capacitive network to switch the operating states of said first and second semi-conductor devices after a time delay when said voltage exceeds a predetermined level.

4. A time delay circuit for operating a relay circuit comprising a pair of semi-conductor devices, said pair including a first semi-conductor device of the NPN type having an input circuit and a second semi-conductor of the PNP type having an output circuit, each said semi-conductor including a base, an emitter and a collector electrode, means for connecting the emitter of said first semi-conductor device to the base of said second semi-conductor device to compensate for differences in base-to-emitter junction potentials resulting from temperature changes, means for biasing said first semi-conductor device to a normally conducting state and said second semi-conductor device to a normally non-conducting state when operating potentials are applied thereto, a resistive capacitive network connected in the input circuit of said first semi-conductor device, and means for applying a control voltage across said resistive capacitive network to switch the operating states of said first and second semi-conductor devices when said voltage exceeds a predetermined level, said control voltage providing the operating potentials for said first and second semi-conductor devices.

References Cited in the file of this patent

UNITED STATES PATENTS

| | | |
|---|---|---|
| 2,828,450 | Pinckaers | Mar. 25, 1958 |
| 2,866,106 | Schuh | Dec. 23, 1958 |
| 2,892,165 | Lindsay | June 23, 1959 |
| 2,901,669 | Coleman | Aug. 25, 1959 |